Jan. 11, 1927. 1,613,831
H. H. HUNTINGTON ET AL
SEED DISCHARGING MECHANISM
Filed March 13, 1922
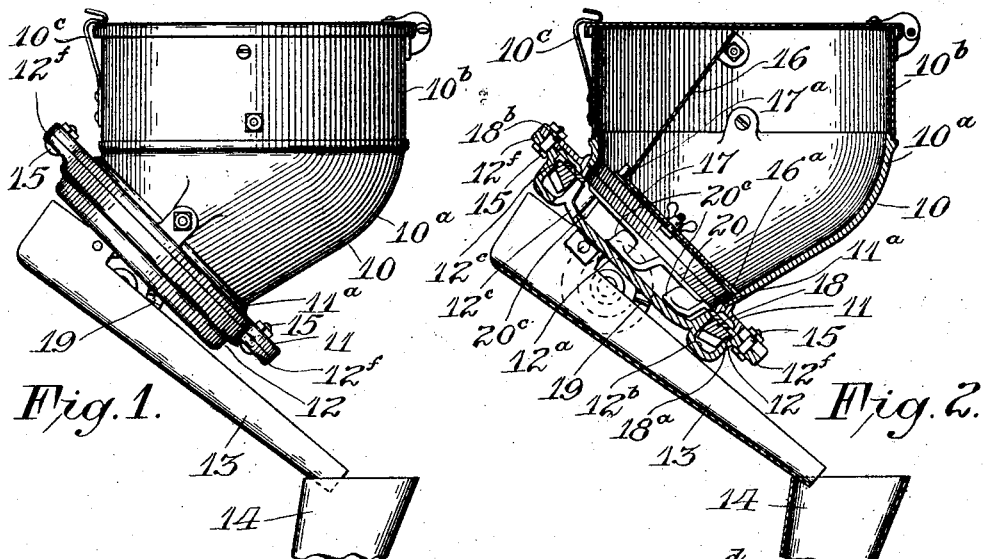
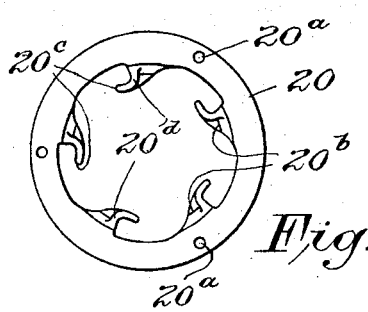
Fig. 7.
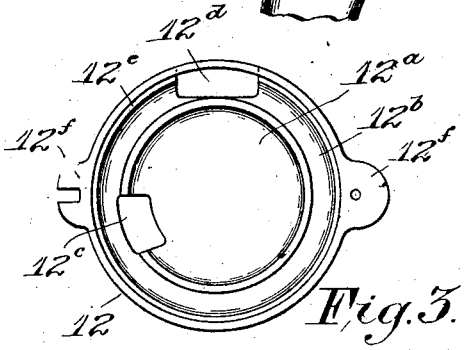
Fig. 3.
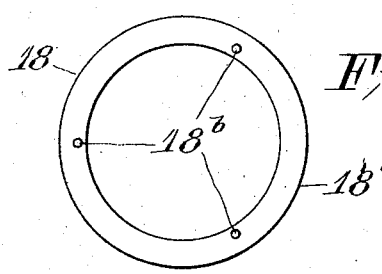
Fig. 5.
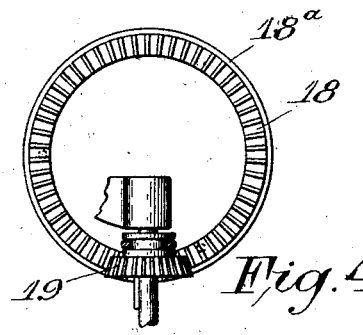
Fig. 4.
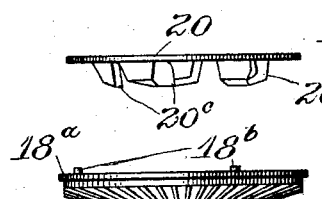
Fig. 6.
Inventors.
Hiram H. Huntington
and Elmer E. Towle,
By H. P. Doolittle
Atty Patented Jan. 11, 1927.

1,613,831

UNITED STATES PATENT OFFICE.

HIRAM H. HUNTINGTON AND ELMER E. TOWLE, OF RICHMOND, INDIANA, ASSIGNORS TO INTERNATIONAL HARVESTER COMPANY, OF CHICAGO, ILLINOIS, A CORPORATION OF ILLINOIS.

SEED-DISCHARGING MECHANISM.

Application filed March 13, 1922. Serial No. 543,263.

This invention relates to mechanism for discharging particles of matter, such as seeds, one by one from a container or hopper, and is more specifically concerned with improvements in the particular type of mechanism making use of gravity for discarding surplus seed from the selecting and discharging means.

The objects of the invention are to simplify the mechanism of this class of devices, and to provide a construction which will be accurate and efficient in operation and afford easy access to the operating parts to permit exchange of the novel form of seed plates employed, and also one so constructed that the seeds are exposed to the least possible number of moving parts, and in which seed selection and discharge are accomplished wholly by gravity and without possibility of bruising the seeds.

These objects are accomplished by providing an inclined dished base plate carrying a hopper the bottom opening of which is of the same size as the dished plate, the seed selecting and carrying means consisting only of projections travelling within the margin of the dished plate and elevating single seeds to a discharge opening, all other moving and driving parts being located outside the dished plate and hopper and away from possible contact with the seeds, the elements and arrangement thereof employed in said construction being of novel form.

With the foregoing principal objects in view, the invention resides in the organization, and parts, or their equivalents, described in the following specification and defined in the claims.

Having reference to the drawings—
Fig. 1 is a side elevation of a hopper and discharge mechanism embodying our invention;

Fig. 2 is a longitudinal vertical section therethrough;
Fig. 3 is a detail plan view of the dished base plate;

Fig. 4 is a detail bottom plan view of the driving gear employed;

Fig. 5 is a detail plan view of the gear ring;

Fig. 6 is a side view of the gear ring shown in Fig. 5;

Fig. 7 is a detail plan view of a feed ring; and,

Fig. 8 is a side view of the same.

In the present instance, we have illustrated our invention as comprising a hopper 10 supported on a ring plate 11, which is mounted on a base plate 12. This base plate is supported on a frame (in this case a walking planter) in any suitable manner, and the seeds discharged from the hopper pass into a chute 13 and thence to a boot 14 which leads to the planting mechanism. The base plate 12 is formed with a central concave or dished portion $12^a$ surrounded by an annular channel portion $12^b$, which are preferably integrally formed. The dished portion of the plate is provided, at a point which becomes approximately its upper margin when in operating position, with a discharge opening $12^c$, and the annular channel is provided with an opening $12^d$ for admission of the driving pinion to be described. The outer wall of the annular channel $12^b$ is formed with a bearing ledge $12^e$, which is slightly below the level of the edge of the marginal wall of the dished portion of the plate and serves to support the drive gear and feed plate to be described. The base plate is also provided with opposite projections $12^f$ which serve for attachment of the ring plate 11, which is formed with similar projections or ears connected to the base plate by bolts 15. The ring plate 11 is of such form and size as to completely cover and seal the channel portion of the base plate leaving the dished portion exposed, and also leaving a sufficient space between itself and the edge of the dished portion of the base plate for admission of the seed feeding device. The inner edge of the ring plate is provided with a seat or ledge $11^a$ on which the hopper 10 is secured, the lower opening of the hopper being thus co-extensive with the dished portion of the base plate.

The hopper is here illustrated as formed of a lower cast portion $10^a$ and an upper sheet metal portion $10^b$ provided with a hinged cover secured by spring latch $10^c$, but it is obvious that a different construction of hopper can be employed if preferred. Within the hopper there is mounted a partition plate 16 which is provided with an opening $16^a$ near the lower bottom wall of the hopper, the size of which opening can be regulated or the opening entirely closed by means of a pivoted valve plate 17, which has an operating handle 17ª accessible between the partition plate 16 and the wall of the hopper. This construction permits the space within the hopper enclosed by the partition plate 16 to be filled with seed, and the seed to be discharged to the lower portion of the dished plate in regulated quantities as desired, and when the opening is closed the hopper can be swung away to afford access to the seed plate. The channel portion of the base plate serves as a seat for a gear ring 18, which is formed with a horizontal marginal flange 18ª engaging and riding on the bearing ledge 12ᵉ on the base plate. This ring is driven by means of a pinion 19 which projects through the aperture 12ᵈ in the channel portion of the base plate. The upper face of the gear ring is provided with a plurality of studs 18ᵇ, and on the gear ring there is supported a feed ring 20 formed with perforations 20ª for receiving the studs 18ᵇ on the gear ring. The gear ring and feed ring must, therefore, rotate together, but the feed ring can be easily removed by simply lifting it from the gear ring.

It will be understood that several feed rings adapted to different seeds may be employed, but as they will vary only in the number and size of the seed carrying members thereon only one of the rings needs to be described. Each ring is formed with integral seed carrying projections 20ᵇ on its inner edge, the ends 20ᶜ of which are offset from the plane of the body of the ring and extends laterally at right angles in the direction of rotation. These ends and the continuing edges of the projections 20ᵇ are flattened or widened as at 20ᵉ and present a hook-like form and provide recesses or seed pockets lying in a plane parallel with that of the ring body and substantially in contact with the bottom of the dished plate at the margin thereof, the under side of the projections 20ᵇ and their ends 20ᶜ conforming in shape to the outer portion and marginal wall of the dished plate and the lateral extensions 20ᵉ forming ledges or lips on which the seed rests before being discharged. These lips or ledges provide space for only a single seed of the kind for which the particular plate being used is intended. The space left between the edge of the dished plate and the inner edge of the ring plate is approximately equal to the thickness of the feed ring, and there is therefore no space or openings left through which seeds can escape into the driving mechanism, the only moving parts to which the seeds are exposed being the projections 20ᵇ.

In operation the pinion 19 drives the gear and feed ring in a contraclockwise direction, and as the seed pockets on the ends 20ᶜ pass the lower side of the dished plate they collect seeds released from the hopper 10 through the feed opening 16ª and elevate them toward the outlet 12ᶜ in the upper side of the dished plate. As the seed pocket travels upwardly excess seed will be discharged by gravity, and when the pocket reaches the outlet there will be but one seed retained on the projecting ledge or lip 20ᶜ. In this way successive seeds are fed to the chute 13 and to the planting mechanism at regular intervals and without danger of injury to the seeds being discharged.

We claim as our invention:

1. A discharging device comprising a dish shaped plate having a discharge opening at one side, and means for feeding seeds to the opening including an element supported for rotation outside the periphery of the plate and provided with a part traveling within the marginal wall of the plate and formed with a pocket adapted to retain a single seed.

2. A discharging device comprising an inclined dished plate having a discharge opening in its upper portion, means for elevating seeds to the opening including an element supported for rotation outside the periphery of said plate and provided with a part traveling within the marginal wall of the plate and formed with a pocket adapted to retain a single seed.

3. A discharging device comprising an inclined concave plate provided with a discharging opening in its upper portion, a feed ring mounted for rotation above the margin of said plate and outside its periphery and formed with projections extending within the concavity of the plate, said projections having seed carrying portions, and means for rotating said ring.

4. A discharging device comprising an inclined concave plate provided with a discharging opening in its upper portion, a feed ring mounted for rotation above the margin of said plate and outside its periphery and formed with projections on its inner edge extending within the concavity of the plate, said projections having seed carrying portions, and means for rotating said ring.

5. A discharging device comprising an inclined plate formed with a concave portion having a discharging opening in its upper side, a feed ring mounted for rotation on said plate outside the margin of said concave portion, means for rotating said ring, and seed carrying projections on the inner edge of said ring extending downwardly within the margin of the concave portion.

6. A discharging device comprising an inclined plate formed with a concave portion having a discharging opening in its upper side, a feed ring mounted for rotation on said plate outside the margin of said concave portion, means for rotating said ring, and projections on the inner edge of said ring extending downwardly within the concave portion and formed with laterally hooked ends extending adjacent the bottom thereof.

7. A discharging device comprising an inclined plate formed with a concave portion having a discharging opening in its upper side, a feed ring mounted for rotation on said plate outside the margin of said concave portion, means for rotating said ring, and projections on the inner edge of the ring extending downwardly within the marginal wall of the concave portion and shaped to conform to the contour thereof and having laterally extending lips lying substantially in contact with the bottom of the concave portion and forming hooklike seed carrying pockets.

8. A discharging device comprising an inclined concave plate provided with a discharging opening in its upper portion, a gear ring supported for rotation outside the periphery of said plate, means for driving the gear, and seed carrying means on the gear comprising projections extending within the concavity of the plate.

9. A discharging device comprising an inclined base plate formed with a central dished portion and an annular channel surrounding the dished portion, said dished portion having a discharging opening in its upper side, a gear ring seated in said channel and having a marginal flange bearing on the edge of the plate, means for driving said gear ring, a seed ring carried by the gear ring, and seed carrying projections on the seed ring extending within the dished portion of the plate.

10. A discharging device comprising an inclined base plate formed with a central dished portion having a discharge opening in its upper side, a hopper supported on the base plate and having a bottom opening coextensive with the dished portion thereof, seed carrying means movable around the margin of said dished portion, and means within the hopper for feeding seeds to the lower side of said dished portion including a partition between the hopper and base plate having a feed opening.

11. A discharging device comprising an inclined base plate formed with a central dished portion having a discharge opening in its upper side, a ring plate supported on the periphery of the base plate and extending to the margin of said dished portion, a hopper supported on the inner edge of said ring plate, and a feed ring mounted for rotation between the outer portion of the base plate and the ring plate and provided with seed carrying projections extending within the dished portion of the base plate.

In testimony whereof we affix our signatures.

HIRAM H. ⨯ HUNTINGTON.
his mark
ELMER E. TOWLE.